March 1, 1932. A. McL. NICOLSON Re. 18,372

SCANNING SYSTEM FOR TELEVISION

Original Filed Oct. 26, 1927 2 Sheets-Sheet 1

INVENTOR
Alexander McLean Nicolson.
BY Jul R. Goshaw
ATTORNEY

March 1, 1932. A. McL. NICOLSON Re. 18,372

SCANNING SYSTEM FOR TELEVISION

Original Filed Oct. 26, 1927 2 Sheets-Sheet 2

INVENTOR
Alexander McLean Nicolson
BY Jul R. Goodpaw
ATTORNEY

Reissued Mar. 1, 1932

Re. 18,372

UNITED STATES PATENT OFFICE

ALEXANDER McLEAN NICOLSON, OF NEW YORK, N. Y., ASSIGNOR TO COMMUNICATION PATENTS, INC., OF NEW YORK, N. Y.

SCANNING SYSTEM FOR TELEVISION

Original No. 1,779,749, dated October 28, 1930, Serial No. 228,712, filed October 26, 1927. Renewed March 21, 1930. Application for reissue filed December 19, 1930. Serial No. 503,577.

This invention relates to a method of and apparatus for transmitting and reproducing images electrically and more particularly to a method of and apparatus for such transmission and reproduction at speeds sufficient to create the illusion of motion, commonly referred to as "television".

It is well known that in the transmission and reproduction of images electrically, it is necessary to determine the value of light intensity at each individual unit of area of the image to be transmitted, and to control at the reproducer a source of light in such a manner that it corresponds in intensity and relative position to that of the corresponding unit of area at the transmitter. In the case of transmission of photographs and facsimiles in which no movement is involved, this process may take place rather slowly, but in case it is desired to transmit images of moving objects, the process must be speeded up to such an extent that approximately sixteen complete images are sent and reproduced per second, this number being sufficient to present the illusion of motion.

It has been usual in the past in the transmitter to utilize a photo electric cell supplying in its output circuit a current or voltage proportional to the intensity of light falling thereon, and to provide apparatus, which operates to cause the light from the successive unit areas of the object to fall successively upon the photo electric cell. This apparatus is termed the "scanning apparatus" and is utilized not only for the purpose just described in the transmitter, but similar apparatus is utilized in the receiver for the purpose of causing the source of light at the receiver to follow the movement of the scanning apparatus at the transmitter and to reconstruct the image to be reproduced.

In my copending application entitled "Method and apparatus for television and the like", Serial No. 218,425, filed Sept. 9th, 1927, I have described an arrangement in which the area to be scanned is illuminated by an electrical arc or discharge which passes over the entire area to be scanned in a predetermined path or pattern. In the arrangement there described, the arc or discharge position is fixed or determined by relative movement of the electrodes between which the discharge takes place, and at least one of the electrodes of the system is a point, with respect to which the discharge does not move. By reason of this construction, the speed of travel of the discharge is limited to the speed which is obtainable with moving masses, which limit is undesirable under certain conditions.

It is an object of this invention to provide a scanning system in which the area to be scanned is illuminated by an electrical discharge passing over all points thereof, and in which the scanning discharge in playing over the area travels at a velocity greatly in excess of the velocity of movement of the electrode system.

It is a further object of this invention to provide a scanning system in which the position of the discharge is always fixed by the space relation between the electrodes from which the discharge takes place, but in which, nevertheless, the discharge passes over the screen at a velocity greatly in excess of the actual velocity of the moving electrodes.

It is still a further object of this invention to provide a scanning system utilizing a pair of continuously relatively movable electrodes for causing a discharge to pass repeatedly in a predetermined pattern over the area to be scanned, at a rate of speed relatively much higher than the rate of movement of said electrodes. Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawings, in which:

In accordance with my invention, I provide a method and apparatus whereby a luminous electrical discharge is produced and caused to follow at a high rate of speed a predetermined scanning pattern in travelling over the area to be scanned, until all individual unit areas have been illuminated by the said discharge. The discharge itself, may be direct current or alternating current of any desired frequency, or any combination of the same, but preferably a relatively high frequency is utilized. The discharge may be made to take place in the open air or in an enclosed chamber containing air under any desired pressure, greater or less than atmospheric, or other gases or mixture of gases may be utilized either with or without finely divided solid or liquid: gases, such as neon, at a relatively low pressure, such as a few millimeters of mercury, are satisfactory.

The electrode system between which the discharge takes place, comprises a pair of relatively movable electrodes so formed and moved with respect to each other, that the discharge passing between them travels at a rate of speed much greater than the speed of the electrodes. The form of the electrodes may be varied within the spirit of my invention, but in general it may be said that the electrode systems are characterized by a pair of relatively movable linear members, which preferably approach each other at a small angle and pass over and by each other without actually making contact, whereby the straight line representing the shortest distance between the two electrodes at any given instant, and impinging on the electrodes at points which I term "intercepts", is caused to pass very rapidly along the surface of the electrodes. A difference of potential is maintained between said electrodes, whereby as the electrodes pass by each other, a discharge passes across the path representing the shortest distance between the said electrodes, which discharge passes laterally along the electrodes at a high rate of speed.

Figure 1:
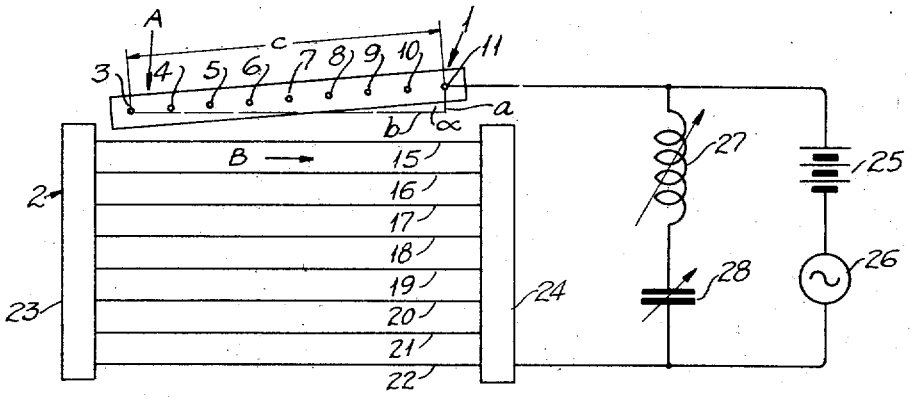
Figures 1, 2 and 3 are diagrammatic views of similar forms of apparatus according to my invention, but differing slightly in detail.

Referring now more particularly to Figure 1, 1 designates one of a pair of relatively movable frames upon which the electrodes are mounted. In this instance, 1 may be a rod or bar of any suitable material, either conducting or insulating, and having mounted thereupon a series of arc or discharge points, such as 3, 4, 5, 6, 7, 8, 9, 10 and 11 projecting outwardly therefrom, all of which points are connected together and to one terminal of the source of potential which causes the discharge. The other electrode system is designated generically by the numeral 2 and comprises a plurality of spaced electrodes 15, 16, 17, 18, 19, 20, 21 and 22, maintained in fixed relationship with each other, in any suitable manner as, for example, being mounted upon the frame members 23 and 24. All of the said electrodes of the electrode system 2 are connected together into the opposite terminal of the source of potential. It will be understood that the number and spacing shown is purely diagrammatic and intended only to illustrate the principle of the invention, it being necessary to provide a sufficient number of individual electrodes and sufficiently closely spaced to supply the requisite detail for any particular image which it is desired to transmit. It will further be understood that in the case of a small image in which there is a large amount of detail, the electrodes will naturally be spaced closely together and a greater number will be utilized than in the case when the image is larger and comprises less detail.

The source of potential may comprise a source of alternating current, such as 26, of any desired frequency. The source 26 may be any convenient instrumentality for supplying the frequency desired. If the frequency desired is relatively low, an alternator may be utilized, while if a high frequency is desired, the source 26 will preferably be a vacuum tube oscillator, or the equivalent. While I have shown a single source 26, it will be understood that a plurality may be provided of different frequencies, if desired: in addition, a source of direct current, such as battery 25 or a direct current generator, may be utilized. The sources 25 and 26 may be shunted by a circuit containing inductance 27 and capacity 28, which may be arranged, if desired, so as to tune the circuit to one or more frequencies: and while I have shown the circuit comprising inductance 27 and capacity 28 in shunt with the source or sources, it will be understood that it may be provided in series and that the elements 27 and 28 may likewise be provided in shunt with each other instead of in series, as shown.

If now, the electrode systems 1 and 2 be arranged so as to be relatively movable in a manner to pass through overlapping relation without actually making contact, and a sufficient difference of potential be maintained between the electrode systems, then as the member 1 passes by the electrode system 2, a spark or discharge will pass between the intercept points of the two systems; that is to say, assuming the electrode member 1 to have a movement in the direction shown by the arrow "A" and assuming the electrode system 2 to be stationary, then it will be seen that the discharge points, 3, 4, 5, 6, 7, 8, 9, 10 and 11 will successively pass by the electrode 15, and if the electrode systems be maintained in parallel relation and the magnitude of potential difference between them be properly controlled, at the instant that each of these discharge points pass across the electrode 15, a discharge or arc will pass between the systems, which will be terminated shortly thereafter. The result of this will be that a series of discharges or arcs will take place upon the electrode 15 moving in the direction shown by the arrow "B" following each other in rapid sequence. It will further be seen that if the angle between the line of electrodes, 3, 4, 5, 6, 7, 8, 9, 10 and 11 be designated as $\propto$, the distance between the two end electrodes 3 and 11 be designated as "$c$", and if a line be drawn from the electrode 3 parallel to the electrode 15, and if a projection perpendicular thereto be dropped thereon from the electrode 11 and this projection be designated as "$a$" and the projection of the line "$c$" upon the line parallel to electrode 15, be designated as "$b$", it will be noted that there is formed a triangle, one of whose angle is a right angle, and we may establish the equation:

$$\tan \propto = \frac{a}{b}$$

from which it follows that $$\text{"}b\text{"} = \frac{a}{\tan \propto} = a \cot \propto -$$

From this it is seen that if the electrode system 1 moves in a direction shown by the arrow "A" with any given velocity, then the velocity of movement of the discharge across the electrode 15 is equal to this velocity multiplied by cot $\propto$.

It will immediately be seen that as $\propto$ is made very small, cot $\propto$ becomes increasingly large: or in other words, the smaller the angle between the electrode systems 1 and 2, the greater the discharge velocity in the direction "B", or conversely, the smaller the necessary velocity of the electrode system in the direction "A", in order to obtain any desired discharge velocity in the direction "B".

It will be understood that while mathematically an infinite velocity of discharge in the direction "B" is obtainable with a very small angle $\propto$, nevertheless, there are practical limits imposed beyond which it becomes difficult to go: that is, if the angle $\propto$ is made extremely small, the difference in distance between the electrode 3 and the electrode 15, and electrode 11 and electrode 15, may become so small that ionization of the space between the electrodes or slight imperfections in the surface of the electrodes or other causes, may prevent the discharge from taking place at the proper time, and thereby interfere with the operation of the system. In general, however, it will be understood that it will be desirable to operate with as small an angle of incidence as may be obtained without interposing excessive difficulties in the control of the discharge.

While I have explained the principle of my invention with respect to the electrode 15, it will be understood that this electrode scans only a single line of the picture, and that the additional electrodes 16, 17 etc., are provided for scanning the additional lines of the picture, and that as the electrode 1 passes across the additional electrodes, a discharge passes in the manner already described. The angle $\propto$ will preferably be made sufficiently small with respect to the spacing between the electrodes 15, 16, etc., that the discharge between the electrode 11 and the electrode 15 terminates before the discharge begins between the electrode 3 and the electrode 16, as, if this were not the case, it would be necessary to insulate the various electrodes and to provide commutating devices for multiple channel operation, which is, for certain purposes, undesirable as it complicates the apparatus and operation, although it will be understood that my invention may be applied for multiple channel operation in the manner described in my patent entitled "Method and apparatus for television and the like", No. 1,779,747, issued Oct. 28, 1930.

The electrode system 1 may comprise points or projections of any suitable material such as platinum, cadmium or other conductor, suitably chosen with respect to the nature of the light radiation desired, and also with respect to its life in operation, and the electrodes 15, 16, 17, etc., may consist of wires, or filaments, provided if desired with discharge points or serrations, or these electrodes may consist of knife edges, either plain or provided with projections, to locate the discharge. The entire electrode system, comprising both movable and stationary electrodes, may operate in open air or within a container comprising air under pressure either greater or less than atmospheric, or suitable gases or mixtures of gases may be supplied to the container, either with or without the exhaustion of air: for example, the discharge may take place within the container comprising neon under a pressure of a few millimeters, or a mixture of neon and helium, or the like: in addition, finely divided solid material or substance capable of vaporization may be utilized, such as mercury, metallic salts and the like, it being understood that the optimum conditions of operation may differ with the nature of the current utilized. An opaque screen, provided with a lens, may be interposed between the electrode system and the image or the screen, for the purpose of focusing, in the manner shown and described in my copending applications, entitled "Method and apparatus for television and the like," Serial Number 218,425, filed Sept. 9th, 1927; "High speed television system," Serial No. 222,417, filed Sept. 28, 1927; and "Pilot television system," Serial Number 225,415, filed October 11, 1927.

The discharge is preferably so controlled in the transmitter as to have a constant luminous intensity, and is arranged to play over successive areas of the subject; in addition, suitable fixed lights may be utilized to furnish a steady illumination of the subject, and one or more photo electric cells are provided, adapted to receive light from the subject, in the manner described in my copending applications above referred to, the output of which may be utilized to control any suitable transmitter. As my invention in this instance is not limited to any particular form of transmitter or receiver, I do not believe it necessary to describe the same in detail, reference being had to the above identified applications for details of systems with which my invention may be utilized.

In the receiving arrangement, the operation of the scanning apparatus is substantially the same as in the transmitter apparatus except that the luminous intensity of the discharge is controlled in accordance with the output of the photo electric cell or cells at the transmitter by supplying a voltage to the electrodes which corresponds to the photo electric cell output, or by controlling the impedance of a path supplied with constant voltage in accordance with the photo electric cell output, or both, or in any other suitable manner as more particularly described in the above identified applications, to which reference is had.

It will also be understood that the invention is not limited to operation with visible light, but that obscure or invisible light may be utilized, such for example as the infra-red or ultra-violet end of the spectrum.

Figure 2:
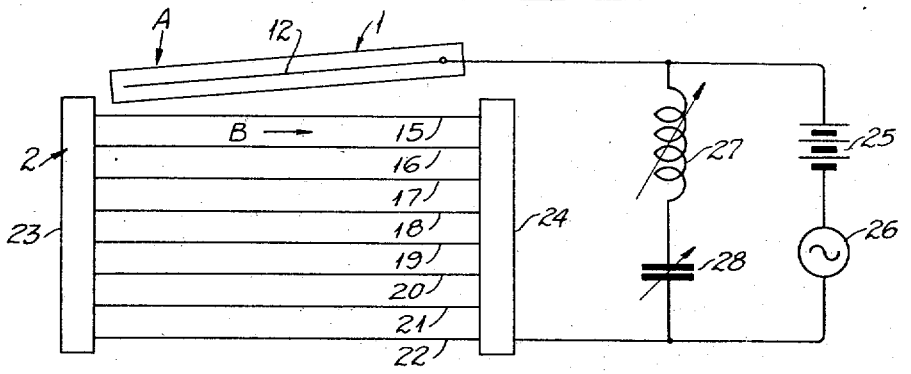

Referring now more particularly to Figure 2 I have shown the electrode 1 as being provided with a single electrode 12 instead of the plurality of electrodes as in Figure 1, the other parts being unchanged. In this instance, it will be understood that if the electrodes 12 and 15 are knife edges, the discharge produced will be continuous rather than intermittent as is the case in Figure 1.

Figure 3:
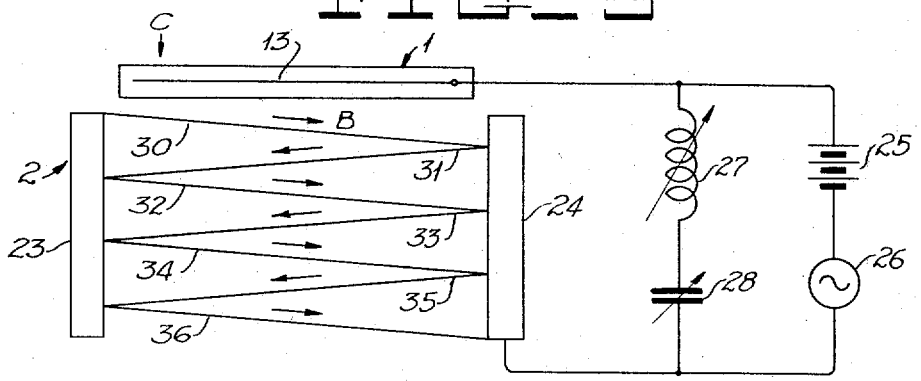

Referring now more particularly to Figure 3, I have shown an arrangement in which the electrode 1 is disposed perpendicularly to the frames 23 and 24 for movement in the same direction as in Figures 1 and 2, whereas the electrodes of system 2 are disposed at an angle other than a right angle to the frames 23 and 24. In this instance, the electrodes of the system 2 may comprise wires, ribbons or knife edges 30, 31, 32, 33, 34, 35, 36, etc., arranged in a zigzag manner, and it will be noted that as the electrode 13 passes downward in the direction shown by the arrow "C", the discharge passes back and forth across the screen, reversing its direction at each edge as shown by the arrow "B", whereas in Figures 1 and 2, the discharge passes across the screen always in the same direction.

Figure 4:
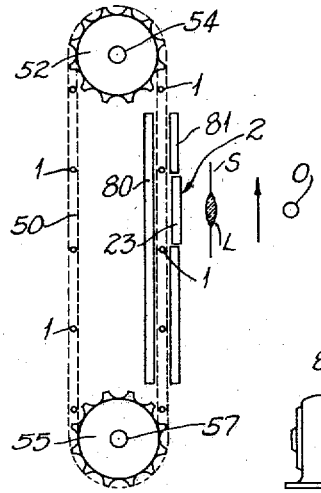
Figures 4 and 5 are respectively, side and front elevations of one form of apparatus according to my invention.
Figure 5:
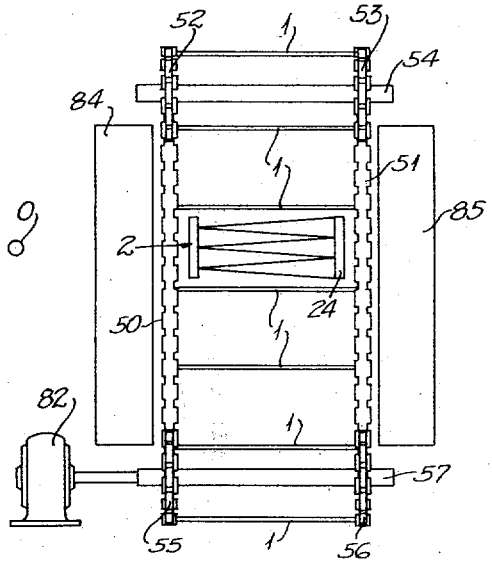

Various arrangements may be utilized for producing the relative motion of the sort required between the electrode systems, one of which is shown diagrammatically in Figures 4 and 5, wherein the bars 1 are mounted upon a pair of travelling chains 50 and 51. A pair of sprocket wheels 52 and 53 mounted on the shaft 54 are provided for carrying the upper loops of the chains, and a similar pair of sprocket wheels 55 and 56 are provided at the lower loops of the chains, which sprocket wheels are mounted on suitable shaft 57. For the purpose of preventing any slack in the chains from disturbing the inner-electrode space and thereby affecting the discharge, suitable guides 80 and 81 may be provided within which the straight portions of the chains are adapted to run, which guides prevent any wobbling in the chains, and corresponding disturbances of the position of the electrodes. The shaft 57 may be rotated by any suitable prime mover such as synchronous motor 82. Still other arrangements may be used, such for example as electrodes reciprocating in guides at as nearly uniform velocity as possible.

An opaque screen "S" provided with a lens "L" may be provided to focus the discharges upon the object "O" whose image is to be transmitted, and in this instance photo-electric cells 84 and 85 may be provided to receive light reflected from the object.

Figure 6:
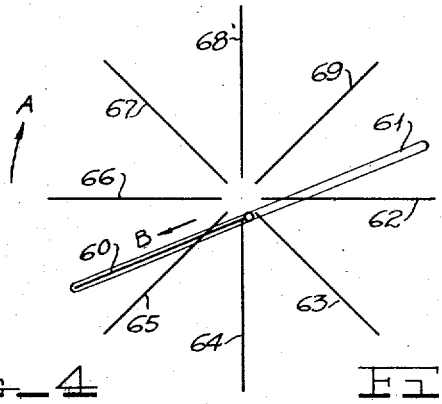
Figure 6 is a diagrammatic view of still another form of apparatus according to my invention.

Referring now more particularly to Figure 6, I have shown a still further modification of the electrode system: in this instance, there may be provided a multiplicity of radial electrodes such as 62, 63, 64, 65, 66, 67, 68 and 69. A rotating lever or carrier rod 61 is provided, pivoted at a point slightly eccentric with respect to the radial electrodes and on this carrier rod there may be provided an electrode 60 which may be a wire or filament, ribbon or knife edge, as already described. This electrode 60 will preferably extend from the center to one end of the carrier rod 61. Upon rotation of the carrier rod 61, it will be observed that the electrode 60 passes each of the radial electrodes at a slight angle in the direction indicated by the arrow "A", and the discharge travels along the radial electrodes in a direction indicated by the arrow "B".

Figure 7:
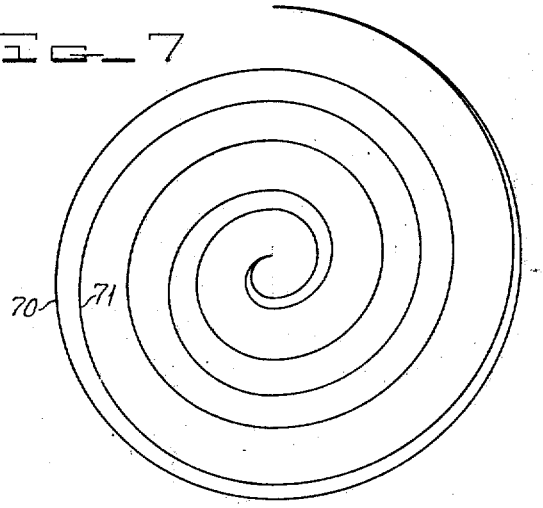
Figure 7 is a diagrammatic view of still a further form of apparatus according to my invention; and, Figure 8 is a side view of apparatus in accordance therewith.

Referring now more particularly to Figure 7, I have shown an arrangement in which the area to be scanned is covered by a discharge travelling in a spiral path rather than in a rectilinear path, as is the case with the arrangements already described. In this instance, 70 and 71 represent spiral electrodes which may, for example, be in a form similar to the well known clock spring. If the spirals be made of different pitch, the relative rotation of the two electrodes 70 and 71 will cause the discharge to move inwardly from the outer end of the electrodes to the inner end, and if the spirals be so chosen that the outer and inner ends of each spiral coincide, then for one complete rotation of either spiral with respect to the other, the discharge will pass from one extremity of the spiral to the other. The spirals may also be made identical and arranged slightly eccentric to each other by an amount preferably less than the pitch.

Figure 8:
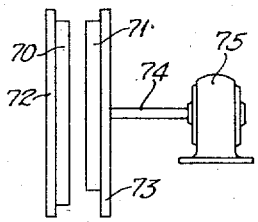

Referring now more particularly to Figure 8, I have shown a side view of an arrangement illustrating the application of the principle of Figure 7. In this instance, 70 and 71 are side views of the spiral electrodes, the electrode 70 being mounted upon a backing plate 72, which, in this instance, may be of transparent material such as glass or quartz: electrode 71 is mounted upon a suitable backing plate 73, which in turn is mounted upon shaft 74 of a suitable motor or other prime mover 75, which may rotate the electrode 71 with respect to the electrode 70.

While I have shown and described certain preferred embodiments of my invention, it will be understood that changes and modifications may be made without departing from the spirit and scope of my invention, as will be understood by those skilled in the art.

I claim:—

1. The method of scanning for television and the like which comprises maintaining between a pair of relatively movable linear electrodes a difference of potential sufficient to cause a discharge to pass between intercepts, and moving said electrodes relatively in such manner as to cause said discharge to travel along said electrodes with a velocity in excess of the velocity of movement of said electrodes to cause successive illumination of unit sections of the area to be scanned.

2. The method of scanning for television and the like which comprises maintaining between a pair of relatively movable linear electrodes a difference of potential sufficient to cause a discharge to pass between intercepts, and moving said electrodes through overlapping relation at a slight angle, whereby said discharge is caused to travel along said electrodes with a velocity in excess of the velocity of movement of said electrodes to cause successive illumination of unit sections of the area to be scanned.

3. The method of scanning for television and the like, which comprises maintaining between a pair of relatively movable linear electrodes a difference of potential sufficient to cause a discharge to pass between intercepts, and varying the relative position of said electrodes to cause said discharge to move and with a velocity in excess of the velocity of movement of said electrodes, and in a direction other than the direction of such movement to cause successive illumination of unit sections of the area to be scanned.

4. The method of scanning for television and the like, which comprises maintaining between a pair of relatively movable linear electrodes a difference of potential sufficient to cause a discharge to pass between intercepts, and moving said electrodes relatively to each other in a direction different from that of the direction of movement of said discharge desired, to cause said discharge to travel with a velocity in excess of the velocity of movement of said electrodes to cause successive illumination of unit sections of the area to be scanned.

5. The method of scanning for television and the like, which comprises maintaining between a pair of relatively movable linear electrodes a difference of potential sufficient to cause a discharge to pass between intercepts, and continuously moving said electrodes relatively in the same direction at an angle to the direction of travel of discharge desired, to cause said discharge to travel along said electrodes at a velocity in excess of the velocity of movement of said electrodes to cause successive illumination of unit sections of the area to be scanned.

6. The method of scanning for television and the like, which comprises maintaining between a pair of relatively movable linear electrodes, a difference of potential sufficient to cause a discharge to pass between intercepts, maintaining an angle less than 45° between said electrodes, and moving said electrodes relatively in a direction normal to the line of one of said electrodes, to cause said discharge to pass along said electrodes with a velocity exceeding that of said electrodes to cause successive illumination of unit sections of the area to be scanned.

7. Scanning apparatus for television and the like, comprising a pair of relatively movable linear electrode systems, arranged at an angle with each other, means for maintaining between said electrodes a potential sufficient to cause a discharge between intercepts, and means for moving said electrodes relatively in a direction normal to the line of one of said electrodes while maintaining the angular relation between said electrodes to cause successive illumination of unit sections of the area to be scanned.

8. Scanning apparatus for television and the like, comprising a pair of relatively movable linear electrode systems, means for maintaining between said electrodes a potential sufficient to cause a discharge and means for moving said electrodes relatively in such a manner as to cause said discharge to travel along said electrodes with a velocity in excess of the velocity of movement of said electrodes to cause successive illumination of unit sections of the area to be scanned.

9. Scanning apparatus for television and the like, comprising a pair of relatively movable linear electrode systems, means for maintaining between said electrodes a potential sufficient to cause a discharge, and means for moving said electrodes through overlapping relation at a slight angle, whereby said discharge is caused to travel along said electrodes with a velocity in excess of the velocity of movement of said electrodes to cause successive illumination of unit sections of the area to be scanned.

10. Scanning apparatus for television and the like, comprising a pair of relatively movable linear electrode systems, means for maintaining between said electrode systems a potential sufficient to cause a discharge and means for moving said electrodes in a direction different from that of the desired discharge movement to cause successive illumination of unit sections of the area to be scanned.

11. In a scanning system for a television system, two sets of relatively movable mediums, means for maintaining between two of said mediums of each set a constant distance of separation and a potential difference sufficient to form an arc therebetween, and means for moving said sets of mediums relatively to one another, said mediums producing between any two thereof a unit light ray to traverse an object with a velocity in excess of the velocity of movement of said mediums to cause successive illumination of unit sections of the area to be scanned.

12. In a scanning system for television and the like, a pair of relatively movable mediums at least one of said mediums including a plurality of members, means for maintaining one of said mediums at a constant distance of separation from any one of said members, means for producing an electrical discharge between one of said mediums and any one of said members, and means for moving one of said mediums and any one of said members relatively to one another in such a manner as to cause said light area to travel along said mediums with a velocity in excess of the velocity of movement of said mediums to provide successive illumination of unit sections of the area to be scanned at a rate to present the illusion of motion.

13. In a scanning system for television and the like, a pair of movable electrodes, means for maintaining between said electrodes a potential difference sufficient to cause a discharge, and means for moving said electrodes in such a manner as to cause said discharge in effect to travel between said electrodes with a velocity in excess of the velocity of movement of said electrodes to cause successive illumination of unit sections of the area to be scanned at a rate to present the illusion of motion.

14. In a scanning system for television and the like, a pair of movable electrodes, means for maintaining between said electrodes a potential difference sufficient to cause a discharge, and means for moving said electrodes through overlapping relation at a slight angle, whereby said discharge is caused in effect to travel between said electrodes with a velocity in excess of the velocity of movement of said electrodes to cause successive illumination of unit sections of the area to be scanned at a rate to present the illusion of motion.

15. Scanning apparatus for television and the like, comprising a pair of movable electrodes, means for maintaining between said electrodes a potential difference sufficient to cause a discharge therebetween, and means for moving said electrodes in a direction different from that of the desired discharge movement to cause successive illumination of unit sections of the area to be scanned.

16. The method of scanning for television and the like which comprises maintaining between a pair of movable electrodes a difference of potential sufficient to cause a discharge to pass between them, and moving said electrodes in such a manner as to cause said discharge in effect to travel between said electrodes with a velocity in excess of the velocity of movement of said electrodes to cause successive illumination of unit sections of the area to be scanned.

17. The method of scanning for television and the like, which comprises maintaining between a pair of movable electrodes a difference of potential sufficient to cause a discharge to pass between them, and varying the position of the electrodes to cause said discharge to move with a velocity in excess of the velocity of movement of said electrodes, and in a direction other than the direction of such movement to cause successive illumination of unit sections of the area to be scanned.

18. The method of scanning for television and the like which comprises maintaining between a pair of mediums a constant distance of separation, said mediums producing a unit light area therebetween, and moving said electrodes relatively to one another in such manner as to cause said light area to travel along said mediums with a velocity in excess of the velocity of movement of said mediums to provide successive illumination of unit sections of the area to be scanned.

Witness my hand this 11th day of December, 1930, at the city of Newark, in the county of Essex, and State of New Jersey.

ALEXANDER McLEAN NICOLSON.